United States Patent [19]

Staendeke

[11] Patent Number: 5,484,830
[45] Date of Patent: Jan. 16, 1996

[54] HALOGEN-FREE, FLAME-RESISTANT POLYMERIC COMPOSITIONS

[75] Inventor: Horst Staendeke, Lohmar, Germany

[73] Assignee: Hoechst Aktiengesellschaft, Frankfurt am Main, Germany

[21] Appl. No.: 187,690

[22] Filed: Jan. 26, 1994

[30] Foreign Application Priority Data

Feb. 9, 1993 [DE] Germany .......................... 43 03 653.8

[51] Int. Cl.$^6$ ........................ C08K 5/3477; C08K 5/529; C09K 21/10; C09K 21/12
[52] U.S. Cl. ........................ 524/101; 524/119; 524/120; 523/179; 252/606; 252/378 R
[58] Field of Search ........................... 252/606; 524/101, 524/119, 120; 523/179

[56] References Cited

U.S. PATENT DOCUMENTS

| | | | |
|---|---|---|---|
| 3,121,082 | 2/1964 | Guttaq ........................ | 524/101 |
| 4,345,002 | 8/1982 | Smith et al. ........................ | 428/288 |
| 4,461,862 | 7/1984 | Eigenmann ........................ | 524/101 |
| 4,801,625 | 1/1989 | Parr et al. ........................ | 523/179 |

FOREIGN PATENT DOCUMENTS

| | | |
|---|---|---|
| 0592219 | 2/1988 | Australia . |
| 0008486 | 3/1980 | European Pat. Off. . |
| 0045835 | 2/1982 | European Pat. Off. . |

OTHER PUBLICATIONS

Rätz, R., et al., *J. Org. Chem.* 28: 1608–1612 (1963).

*Primary Examiner*—Philip Tucker
*Assistant Examiner*—Joseph D. Anthony
*Attorney, Agent, or Firm*—Connolly and Hutz

[57] ABSTRACT

Halogen-free, flame-resistant polymeric compositions contain an intumescence flameproofing system which comprises ammonium polyphosphate and an organophosphorus nitrogen component. The organophosphorus nitrogen component here is a phosphoric acid polyester according to the formula or the formula In these formulae, R is $CH_2$, $C_2H_4$ or $C_3H_6$, while m is 1 to 10 and n is 1 to 6.

4 Claims, No Drawings

HALOGEN-FREE, FLAME-RESISTANT POLYMERIC COMPOSITIONS

The present invention relates to halogen-free flame-resistant polymeric compositions which contain an intumescence flameproofing agent comprising ammonium polyphosphate and an organophosphorus nitrogen component.

A flameproofing system for polyolefins which comprises a mixture of ammonium polyphosphate and tris(2-hydroxyethyl)isocyanurate is known from AU-PS 592 219.

The disadvantage of this flameproofing agent is the high water-solubility of the tris-hydroxyalkyl isocyanurate, which acts as a synergist.

The object of the present invention is therefore to provide a flameproofing system for polymeric compositions which, in addition to ammonium polyphosphate, comprises a substance which is comparable to the tris-hydroxyalkyl isocyanurate in its synergistic properties and at the same time has only a low water-solubility.

Surprisingly, phosphoric acid polyesters of the formula

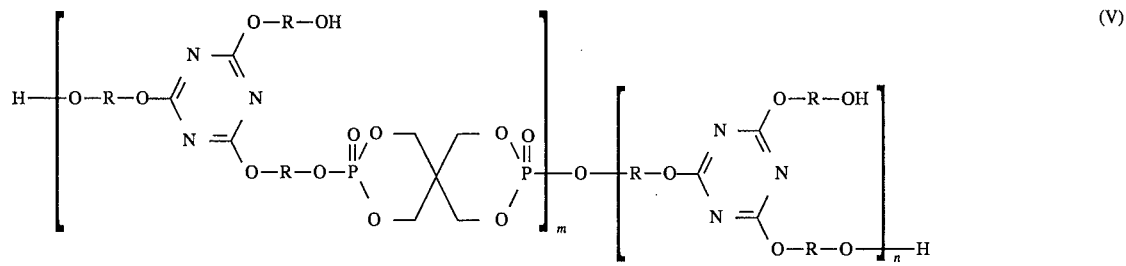

(V)

or

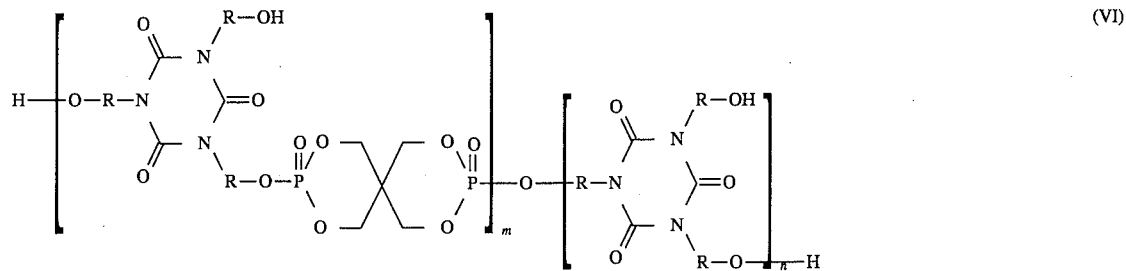

(VI)

in which R is $CH_2$, $C_2H_4$ or $C_3H_6$ and m is 1 to 10 and n is 1 to 6, are sparingly water-soluble and act as a synergist with ammonium polyphosphate in flameproofing systems for polymeric compositions.

The flame-resistant compositions according to the invention can optionally also be composed such that a) the intumescence flameproofing system contained in them comprises 30 to 70% by weight of phosphoric acid polyester;

b) they contain 15 to 40% by weight of the flameproofing agent;

c) they are thermoplastics;

d) the thermoplastics are polyolefins.

The phosphoric acid polyesters which are a constituent of the intumescence flameproofing system of the flame-resistant polymeric compositions according to the invention can be prepared by first allowing pentaerythritol to react with excess phosphorus oxychloride to give the dichloride of the cyclic phosphoric acid ester 2,4,8,10-tetraoxa-3,9-dioxo-3, 9-dichloro-phosphaspiro-5.5]-undecane, it being possible for the dichloride to be converted into the cyclic phosphoric acid ester 2,4,8,10-tetraoxa-3,9-dioxo-3,9-dihydroxy-phosphaspiro-5.5]-undecane by hydrolysis.

These conversions are based on the following reactions:

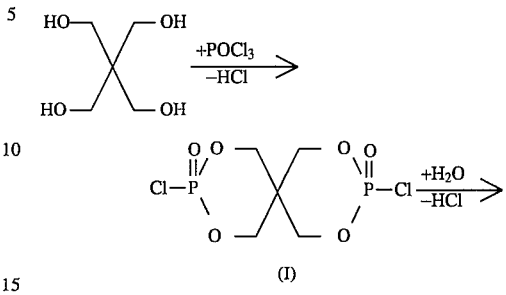

(I)

-continued (II)

(cf. R. Rätz and O. J. Sweeting in: Journal of Organic Chemistry, Volume 28 (1963) pages 1608 to 1612).

The cyclic phosphoric acid esters (II) thus obtained are reacted at temperatures of 120° to 250° C. with a tris-hydroxyalkyl cyanurate of the formula (III)

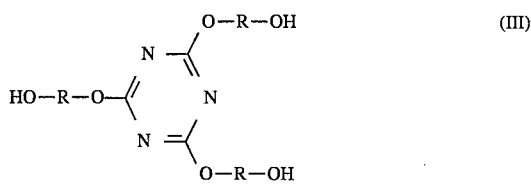

or a tris-hydroxyalkyl isocyanurate of the formula (IV)

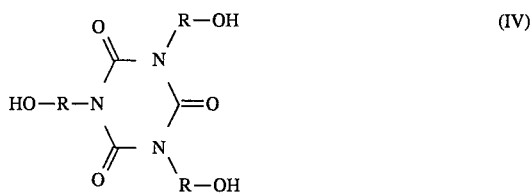

in the presence of a catalyst, for example tetra-n-butyl titanate, for 2 to 12 hours, reaction products of the formula (V)

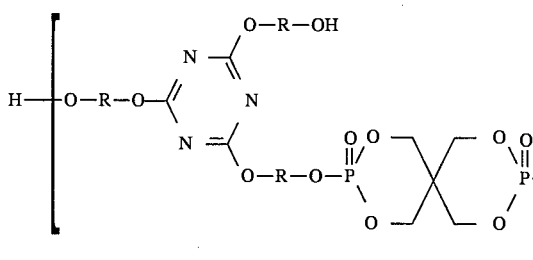

or of the formula (VI)

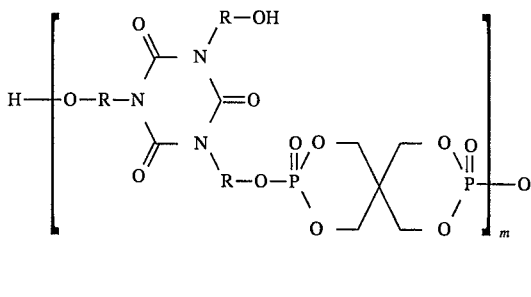

in which R is $CH_2$, $C_2H_4$ or $C_3H_6$ and m is 1 to 10 and n is 1 to 6, being formed with water being split off.

The phosphoric acid polyesters can be prepared by reaction of the cyanurate with the cylic phosphoric acid ester in a molar ratio of 5: (5 to 2), the water-solubility of the resulting phosphoric acid polyester decreasing as the content of cyclic phosphoric acid ester decreases.

The ammonium polyphosphate which is a constituent of the intumescence flameproofing system of the flame-resistant polymeric compositions according to the invention can be a free-flowing, pulverulent, sparingly water-soluble ammonium polyphosphate of the formula $(NH_4PO_3)_n$, where n has values from 200 to 1000, and can have a particle size of more than 99% <45 μm. The ammonium polyphosphate here can contain up to 25% by weight of a water-insoluble synthetic resin, which is cured if appropriate and envelops the individual ammonium polyphosphate particles.

The percentage data in the following examples are percentages by weight.

EXAMPLE 1

1096 g (4.2 mol) of tris-(2-hydroxyethyl)isocyanurate (THEIC)

1092 g (4.2 mol) of cyclic phosphoric acid ester (2,4,8,10-tetraoxa-3,9-dioxo-3,9-dihydroxyphosphaspiro [5.5]-undecane)

21 g of tetra-n-butyl titanate were introduced into a laboratory kneader (working volume: 5 l) which can be heated, and were reacted under a gentle stream of nitrogen in accordance with the following time/temperature program:

| Time (hours) | Temperature (°C.) |
|---|---|
| 2 | 20–150 |
| 1 | 150–170 |
| 4 | 170–185 |

After cooling, the reaction product was ground in a porcelain bead mill and then analyzed:

| Content of | phosphorus | 10.0% |
|---|---|---|
| | carbon | 33.5% |
| | nitrogen | 9.0% | water-solubility at 25° C.: 3.0 water-solubility at 60° C.: 3.4%

EXAMPLE 2

The procedure was analogous to Example 1, but 1044 g (4 mol) of THEIC 780 g (3 mol) of cyclic phosphoric acid ester 18 g of tetra-n-butyl titanate were employed.

The starting substances were reacted in accordance with the following time/temperature program:

| Time (hours) | Temperature (°C.) |
|---|---|
| 2 | 20–150 |
| 1 | 150–170 |
| 2 | 170–190 |

The reaction product was worked up analogously to Example 1 and analyzed:

| Content of | phosphorus | 11.9% |
|---|---|---|
| | carbon | 32.9% |
| | nitrogen | 8.2% | water-solubility at 25° C.: 1.7
water-solubility at 60° C.: 1.9%

EXAMPLE 3

The procedure was analogous to Example 1, but
1305 g (5 mol) of THEIC
650 g (2.5 mol) of cyclic phosphoric acid ester
20 g of tetra-n-butyl titanate
were employed.
The starting substances were reacted in accordance with the following time/temperature program:

| Time (hours) | Temperature (°C.) |
|---|---|
| 2 | 20–150 |
| 2 | 150–170 |
| 2 | 170–200 |

The reaction product was worked up analogously to Example 1 and analyzed:

| Content of | phosphorus | 8.3% |
|---|---|---|
| | carbon | 36.9% |
| | nitrogen | 11.2% | water-solubility at 25° C.: 0.4
water-solubility at 60° C.: 0.5%

EXAMPLE 4

The procedure was analogous to Example 1, but
1305 g (5 mol) of THEIC
520 g (2 mol) of cyclic phosphoric acid ester
18 g of tetra-n-butyl titanate
were employed.
The starting substances were reacted in accordance with the following time/temperature program:

| Time (hours) | Temperature (°C.) |
|---|---|
| 2 | 20–150 |
| 2 | 150–170 |
| 6 | 170–200 |

The reaction product was worked up analogously to Example 1 and analyzed:

| Content of | phosphorus | 7.1% |
|---|---|---|
| | carbon | 37.8% |
| | nitrogen | 12.0% | water-solubility at 25° C.: 0.2
water-solubility at 60° C.: 0.4%

The phosphoric acid polyester prepared according to Examples 1 to 4 were tested as ammonium polyphosphate synergists for flame resistant treatment of polymeric compositions.

The oxygen index test in accordance with ASTM-D 2863 and the UL 94 vertical test in accordance with Underwriters Laboratories "Test for Flammability of Plastic Material-UL 94" were carried out as burning tests in the following Examples 5 to 13.

The results of the burning tests and the water-solubility of the synergists employed are summarized in the accompanying table.

EXAMPLE 5

(Comparison example)

5000 g of ®Hostalen PPU 0180 P
  (Hoechst Aktiengesellschaft, Frankfurt) this is a polypropylene powder having a melt flow index MFI 230/5 of about 55 g/10 minutes
1350 g of ®Hostaflam AP 422
  (Hoechst Aktiengesellschaft, Frankfurt) this is a fine-grained sparingly water-soluble ammonium polyphosphate of the formula $(NH_4PO_3)_n$, in which n is ~700; the particle size of the ammonium polyphosphate is >99% <45 μm
450 g of tris-(2-hydroxyethyl)isocyanurate (THEIC)
70 g of ®Kronos 2220
  (Kronos Titan GmbH, Leverkusen) this is a titanium dioxide pigment of the rutile type
70g o f ®HDK N20
  (Wacker-Chemie GmbH, Munich) this is pyrogenic silicic acid
10g of calcium stearate
10 g of ®Hostanox 03
  (Hoechst Aktiengesellschaft, Frankfurt) this is an antioxidant based on polynuclear phenols
10g of ®Hostanox SE 10
  (Hoechst Aktiengesellschaft, Frankfurt)
  this is an antioxidant based on dialkyl sulphides
10g of ®Hostanox PAR 24
  (Hoechst Aktiengesellschaft, Frankfurt)
  this is an aromatic phosphite [tris-(2,4-di-tert.-butylphenol)-phosphite] were mixed in a SPANGENBERG intensive mixer (20 1 capacity) and the mixture was extruded at 180° to 200° C. in a WEBER small extruder (20 mm screw diameter) and granulated with the aid of a DREHER laboratory granulator.

Test sheets 1.6 mm thick were produced from the dried granules in a steam-heated BECKER-VAN-HÜLLEN press at a temperature of 195° C. under a pressure of 2 to 3 bar (5 to 10 minutes) and 300 bar (2 minutes), and test specimens 127 mm long and 12.7 mm wide were cut out of the test sheets.

EXAMPLE 6

(according to the invention)

The procedure was analogous to Example 5, but 470 g of ®Hostaflam AP 422 and, instead of THEIC as the synergist, 735 g of phosphoric acid polyester according to Example 1 were employed.

EXAMPLE 7

(according to the invention)

The procedure was analogous to Example 5, but 1100 g of ®Hostaflam AP 422 and 1100 g of phosphoric acid polyester according to Example 1 were employed.

EXAMPLE 8

(according to the invention)

The procedure was analogous to Example 6, but, as the synergist, 735 g of phosphoric acid polyester according to Example 4 were employed.

EXAMPLE 13

(according to the invention)

The procedure was analogous to Example 5, but 1100 g of ®Hostaflam AP 422 and, as the synergist, 1100 g of phosphoric acid polyester according to Example 4 were employed.

TABLE

| Example | Flameproofing agent concentration | APP[1]/synergist ratio | Water-solubility of the synergist at a temperature | | Oxygen index | UL 94 class |
|---|---|---|---|---|---|---|
| | | | of 25° C. | of 60° C. | | |
| 5 (comparison) | 26% | 3:1 | 100% | 100% | 0.35 | V-0 |
| 6 (invention) | 30% | 2:1 | 3.0% | 3.4% | 0.36 | V-0 |
| 7 (invention) | 30% | 1:1 | 3.0% | 3.4% | 0.37 | V-0 |
| 8 (invention) | 30% | 1:2 | 3.0% | 3.4% | 0.36 | V-0 |
| 9 (invention) | 28% | 1:1 | 1.7% | 1.9% | 0.33 | V-0 |
| 10 (invention) | 28% | 2:1 | 0.4% | 0.5% | 0.35 | V-0 |
| 11 (invention) | 28% | 1:1 | 0.4% | 0.5% | 0.35 | V-0 |
| 12 (invention) | 30% | 2:1 | 0.2% | 0.4% | 0.34 | V-0 |
| 13 (invention) | 30% | 1:1 | 0.2% | 0.4% | 0.36 | V-0 |

[1]APP = ammonium polyphosphate

The procedure was analogous to Example 5, but 735 g of ®Hostaflam AP 422 and 1470 g of phosphoric acid polyester according to Example 1 were employed.

EXAMPLE 9

(according to the invention)

The procedure was analogous to Example 5, but 1010 g of ®Hostaflam AP 422 and, as the synergist, 1010 g of phosphoric acid polyester according to Example 2 were employed.

EXAMPLE 10

(according to the invention)

The procedure was analogous to Example 5, but 1350 g of ®Hostaflam AP 422 and, as the synergist, 675 g of phosphoric acid polyester according to Example 3 were employed.

EXAMPLE 11

(according to the invention)

The procedure was analogous to Example 5, but 1010 g of ®Hostaflam AP 422 and, as the synergist, 1010 g of phosphoric acid polyester according to EXAMPLE 3 were employed.

EXAMPLE 12

(according to the invention)

I claim:

1. A halogen-free, flame-retardant polymeric composition containing a thermoplastic polymer and, 15 to 40% by weight of an intumescence flame-retardant system, which flame-retardant system comprises ammonium polyphosphate and an organophosphorus nitrogen compound in a ratio by weight between (2:1) to (1:2), wherein the organophosphorus nitrogen compound is a phosphoric acid polyester of the formula

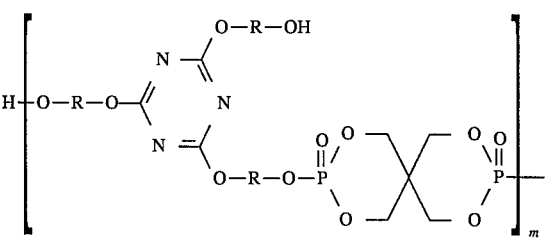

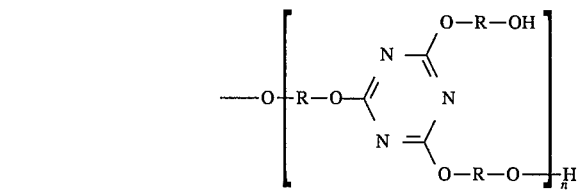

in which R is selected from the group consisting of methylene, ethylene and propylene and m is 1 to 10 and n is 1 to 6.

2. The halogen-free, flame-retardant polymeric composition as claimed in claim 1, wherein the thermoplastic is a polyolefin.

3. A halogen-free, flame-retardant polymeric composition containing a thermoplastic polymer and 15 to 40% by weight of an intumescence flame-retardant system, which flame-retardant system comprises ammonium polyphosphate and an organophosphorus nitrogen compound in a ratio by weight between (2:1) to (1:2), wherein the organophosphorus nitrogen compound is a phosphoric acid polyester of the formula

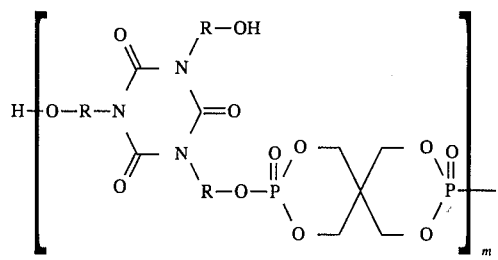

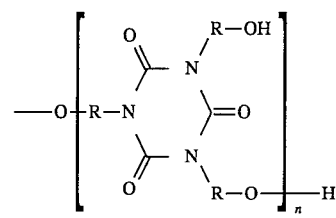

in which R is selected from the group consisting of methylene, ethylene and propylene and m is 1 to 10 and n is 1 to 6.

4. The halogen-free, flame-retardant polymeric composition as claimed in claim 3, wherein the thermoplastic is a polyolefin.

* * * * *